May 12, 1964     R. P. DOERER     3,132,353
INSULATOR STRUCTURE
Filed Nov. 13, 1961     2 Sheets-Sheet 1
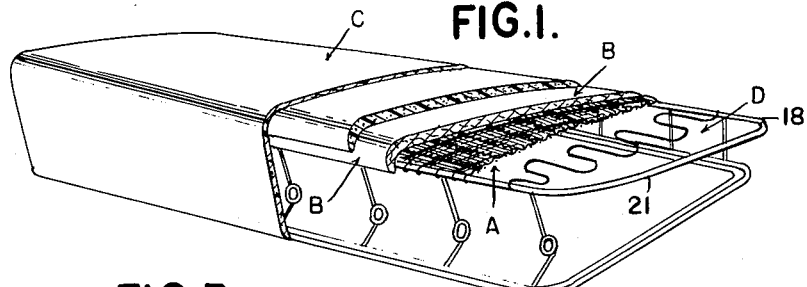
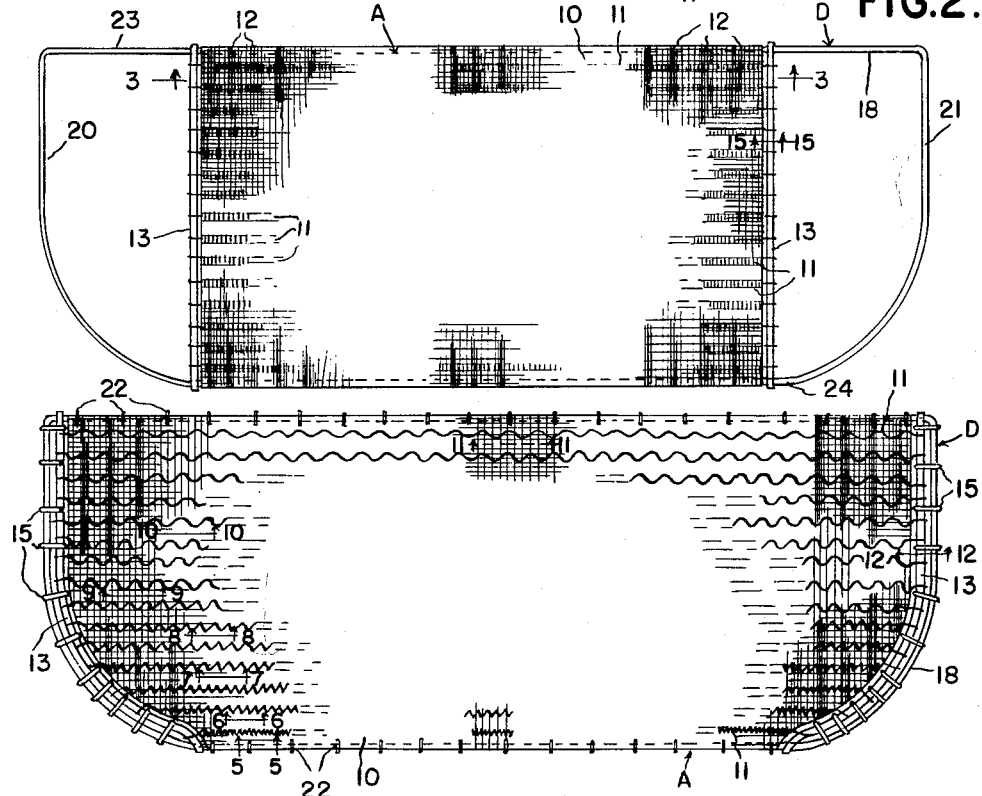
*INVENTOR.*
RICHARD P. DOERER.
BY
ATTORNEYS May 12, 1964 R. P. DOERER 3,132,353
INSULATOR STRUCTURE
Filed Nov. 13, 1961 2 Sheets-Sheet 2
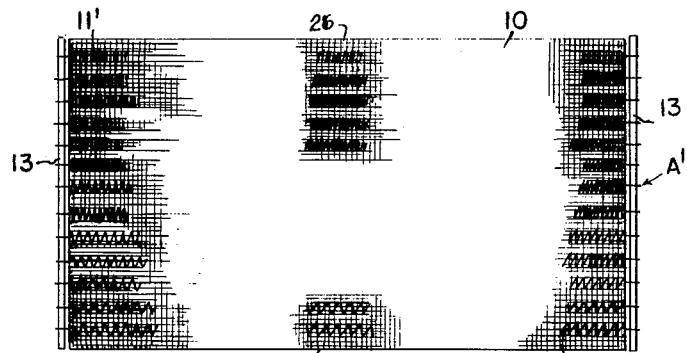
FIG.16.
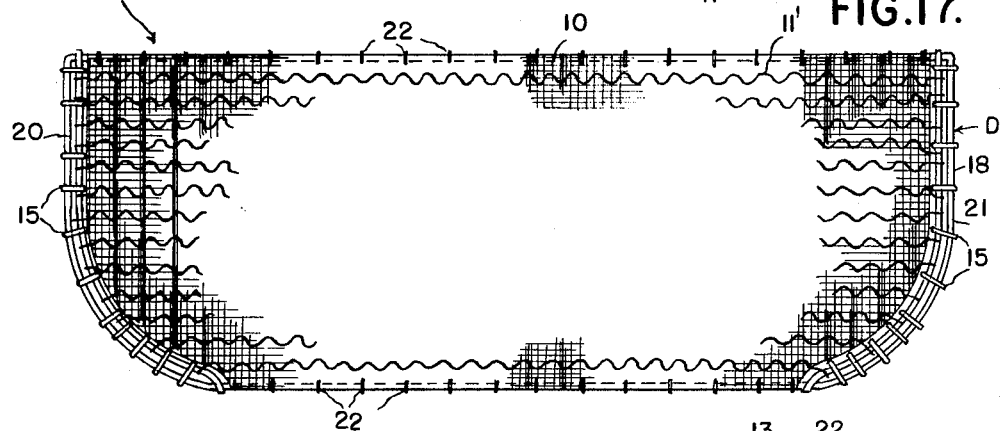
FIG.17.
FIG.5.
FIG.6.
FIG.7.
FIG.8.
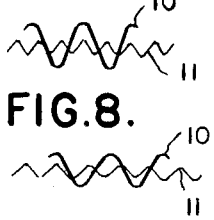
FIG.9.
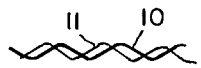
FIG.10.
FIG.11.
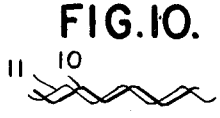
FIG.14.
FIG.12.
FIG.13.
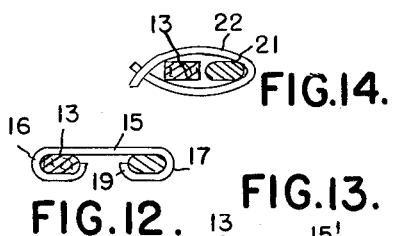
FIG.15.
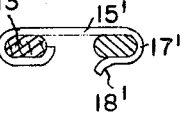
FIG.18. FIG.19.
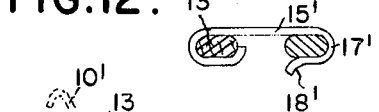
INVENTOR.
RICHARD P. DOERER
BY
Whittemore, Hulbert & Belknap
ATTORNEYS United States Patent Office 3,132,353
Patented May 12, 1964

3,132,353
INSULATOR STRUCTURE
Richard P. Doerer, Ypsilanti, Mich., assignor to Van Dresser Specialty Corporation, Warren, Mich., a corporation of Michigan
Filed Nov. 13, 1961, Ser. No. 151,773
9 Claims. (Cl. 5—354)

This invention relates generally to insulators for use between the padding and supporting spring structure of an upholstered assembly.

One of the essential objects of the invention is to provide a flexible, bodily stretchable insulator at least a portion of which, extending in one direction between opposite edges of said insulator, has in the free state of the insulator a dimension in the said one direction less than the dimension of the corresponding portion of the supporting spring structure in the aforesaid direction, and is bodily stretched to conform to the contour of the supporting spring structure.

Another object is to provide an elongated, flexible, bodily stretchable insulator having in its free state an overall dimension in one direction less than the minimum dimension of the supporting spring structure in the aforesaid direction, and is bodily stretched to conform to the contour of the supporting spring structure.

Another object is to provide an insulator including an elongated sheet of flexible material and a plurality of elongated, laterally spaced, substantially parallel, stretchable, resilient, reinforcing strands threaded through the sheet.

Another object is to provide an insulator wherein the reinforcing strands are threaded through pleats or undulations in the sheet which extend at right angles to the strands.

Another object is to provide an insulator wherein the reinforcing strands are preferably helically coiled wires.

Another object is to provide an insulator provided along opposite edges thereof with anchorage portions to which the reinforcing strands are terminally connected.

Another object is to provide an insulator wherein, in the free state of the reinforcing strands, certain of the strands are of one pitch and other of the strands are of a different pitch to accommodate heavy local loads and to simulate strands of the same pitch when the insulator is bodily stretched.

Another object is to provide an insulator wherein certain of the reinforcing strands are of one diameter and other of the reinforcing strands are of a different diameter to accommodate heavy local loads.

Another object is to provide means for anchoring the insulator to the supporting spring structure including fasteners secured to the insulator at opposite edges thereof and adapted for quick attachment to a border frame of the supporting spring structure.

Another object is to provide an insulator that is simple in construction, economical to manufacture, and efficient in use.

Other objects, advantages and novel details of construction of the invention will be made more apparent as this description proceeds, especially when considered in connection with the accompanying drawings wherein:

FIGURE 1 is a perspective view of an upholstered assembly provided with an extensible insulator embodying my invention, and showing parts broken away and in section.

FIGURE 2 is a top plan view of the insulator, shown overlying a supporting spring structure of an upholstered assembly before being stretched to a configuration conforming to the contour of the border frame of the supporting spring structure.

FIGURE 3 is a sectional view taken on the line 3—3 of FIGURE 2.

FIGURE 4 is a view similar to FIGURE 2 but shows the insulator after it has been bodily stretched to conform to the contour of the border frame of the supporting spring structure and marginally secured thereto.

FIGURES 5–11, inclusive, are sectional views taken respectively on the lines 5—5, 6—6, 7—7, 8—8, 9—9, 10—10 and 11—11, of FIGURE 4.

FIGURE 12 is a sectional view taken on the line 12—12 of FIGURE 4.

FIGURE 13 is similar to FIGURE 12 but shows a modification.

FIGURE 14 is similar to FIGURES 12 and 13 but shows still another modification.

FIGURE 15 is a sectional view taken on the line 15—15 of FIGURE 2.

FIGURE 16 is a top plan view of an insulator having a modified construction, being shown in its initial free state.

FIGURE 17 is a top plan view of the insulator of FIGURE 16 after it has been stretched to a configuration conforming to the contour of the border frame of the supporting spring structure, shown marginally secured to the border frame.

FIGURES 18 and 19 are sectional views taken through reinforcing strands of different diameters.

In the drawings, A is an elongated, rectangular, substantially horizontally extending, flexible, bodily stretchable, sheet-like insulator embodying my invention disposed between an overlying padding B for an exterior trim material C and an elongated underlying supporting spring structure D of an upholstered assembly.

As shown, the insulator A includes an elongated, substantially rectangular extensible sheet 10 of flexible material, and separate elongated, laterally spaced, parallel, stretchable, resilent, reinforcing strands 11 of uniform length threaded lengthwise through the extensible rectangular sheet 10.

The rectangular sheet 10 is formed with a longitudinal series of transverse pleats or undulations 12, and the reinforcing strands 11 are preferably in the form of helically coiled wires at right angles to the pleats. The strands 11 thread through the pleats 12 so that alternate pleats lie on opposite sides of the strands. In the initial free state of the insulator shown in FIGURE 2, the undulations or pleats 12 are relatively deep and close together, substantially as shown in FIGURE 5, and the reinforcing strands are all of the same pitch, being suitably coiled and having a plurality of convolutions between successive undulations or pleats of the sheet. It will be understood that in some instances the pleats may extend longitudinally of the sheet and the strands may extend transversely of the sheet and may be threaded through the longitudinally extending pleats.

The insulator A also includes a pair of elongated anchorage portions 13, one along each end of and separate from the sheet 10. Alternatively, each anchorage portion may be integral with and formed as a rolled or folded end of the sheet, as indicated at 10′ in dotted lines in FIGURE 15. The reinforcing strands 11 are terminally provided at each end with return bent portions 14 which are clamped around the anchorage portions 13.

The supporting spring structure includes an elongated substantially horizontal border frame 18 of predetermined length, made to the desired configuration and area from a wire element or the like and having contoured ends 20 and 21. It will be noted that the rectangular insulator 10 has, in its initial free state shown in FIGURE 2, an overall length less than the minimum lengthwise dimension of the border frame, measured between the ends 20 and 21 thereof.

A plurality of laterally spaced clips 15 are provided along each end of the insulator, each clip being formed at one end with a return bent portion 16 which is clamped around an anchorage portion 13, and being formed at the opposite end with a return bent portion 17 for quick attachment to the border frame 18 of the supporting spring structure D. The clips 15 are preferably of the clinch type, wherein the return bent portion 17 has a deformable end 19 which can be pried open to receive the border frame 18 of the supporting spring structure and then clinched thereon as shown in FIGURE 12.

Other types of clips can be employed. For example, FIGURE 13 illustrates a resilient snap-on type clip 15', a plurality of which can be used in place of clips 15. The return bent portion 17' of each clip 15' has a flared end 18' so that the border frame can snap into the return bent portion, facilitated by the flared end 18', and be resiliently held therein. Otherwise, clips 15' are exactly like the clips 15 and are secured to an anchorage portion 13 of the insulator in the same way.

The clips 15 or 15' may be permanently clamped on the anchorage portions 13 of the insulator for quick attachment of the insulator to the border frame of the supporting spring structure.

Although the various elements of my insulator may be formed of any suitable material for the purposes set forth, the rectangular sheet 10 is preferably formed of burlap, and the reinforcing strands 11 are preferably formed of wire of circular cross section. The anchorage portions 13 are preferably formed of rolled or folded burlap, and the clips are preferably formed of flat or round wire stock.

In order to apply the insulator A to the border frame 18 of the supporting spring structure, one end of the insulator is attached to one end 20 or 21 of the border frame by engaging the return bent portions 17 or 17' of the clips 15 or 15' over the corresponding end of the border frame. The insulator is then bodily stretched horizontally to a configuration conforming to the contour of the horizontal border frame and its opposite end secured to the opposite end of the border frame by engaging the return bent portions 17 or 17' over the opposite end of the border frame.

As an alternative, the clips 15 may be replaced by hog rings 22. A plurality of spaced hog rings along the length of each anchorage portion 13 will be provided to embrace both the anchorage portion and the border frame at the corresponding end of the supporting spring structure. This is shown in FIGURE 14. The hog rings, while of any suitable flexible deformable material, are preferably of metal and are formed as an open loop capable of being deformed to cross or open the ends to secure the anchorage portion of the insulator to or release it from the border frame.

The same procedure is employed to secure the insulator to the border frame by hog rings; that is, the hog rings encircling the anchorage portion at one end of the insulator will be clinched about the corresponding end of the border frame, the insulator will be bodily stretched to a configuration conforming to the contour of the border frame, and thereafter the hog rings encircling the other anchorage portion of the insulator will be clinched about the other end of the border frame.

Either before or after the ends of the insulator are secured by the clips or hog rings as described above, the longitudinal edges of the insulator will be secured to the parallel sides 23 and 24 of the border frame 18 by additional spaced hog rings 22. The hog rings 22 along the longitudinal edges of the insulator pierce the body of the sheet 10 and encircle the sides 23 and 24 of the border frame. It will be noted that the width of the insulator A, in its free state, is substantially equal to the distance between the sides 23 and 24 of the border frame.

Since the ends 20 and 21 of the border frame are contoured or curved as shown in FIGURES 2 and 4, different longitudinal segments of the insulator will be stretched different amounts (FIGS. 4-11). Referring to FIGURES 4 and 11, it will be seen that along side 23 of the border frame, the sheet and coiled reinforcing strands are stretched considerably. However, both the pleated fabric and reinforcing strands, although bodily stretched, remain in an undulated condition. Referring to FIGURES 4 and 5, it will be noted that along the opposite side 24 of the border frame, the pleated fabric and the coiled reinforcing strands are extended very little if at all. Hence in this section of the insulator, the pleats or undulations in the fabric are deep and the reinforcing strands are more closely coiled. Between the opposite longitudinal edges of the insulator, the fabric and reinforcing strands are stretched varying amounts, as will be apparent from an inspection of FIGURES 4 and 6-10.

It will be observed that both the fabric sheet 10 and the reinforcing strands 11 remain in an undulated condition after application to the border frame of the supporting spring structure at all points, although at some points the undulations are deeper or more closely formed than at others. Hence, the insulator, when applied to the supporting spring structure as shown in FIGURE 4, remains stretchable at all points to compensate for localized loads imposed thereon.

Referring to FIGURES 16 and 17, an insulator A' of modified construction is shown. This insulator differs from the one shown in FIGURES 2-4 in that the reinforcing strands 11', in their initial free state, are not all of the same pitch. As noted in FIGURE 16, the strands near one longitudinal edge 26 of the insulator are of relatively small pitch and the strands near the opposite longitudinal edge 27 are of a relatively greater pitch. The intermediate strands are of progressively greater pitch from the longitudinal edge 26 to the other edge 27. In this instance, the pitch of the strands has been varied so that when the insulator is stretched bodily and secured to the border frame, as in FIGURE 17, the variously stretched strands will all be of the same pitch and hence will simulate strands of the same pitch. It will be understood, of course, that other variations in the pitch of the strands may be made to compensate for heavy localized loads which may occur in certain areas of the upholstered assembly.

While both the insulator A shown in FIGURES 2, 3 and 4 and the insulator A' shown in FIGURES 16 and 17 may have reinforcing strands all of the same circular cross-section, the cross-section of the various strands may be varied to compensate for heavy localized loads in particular areas of the upholstered assembly. Thus, as shown in FIGURES 18 and 19 one strand 11a may be of a greater diameter than another 11b. The strands 11a and 11b may be considered to be different strands of either of the insulators A or A'. Hence, the insulator A' for example, shown in FIGURES 16 and 17, may have reinforcing strands which, in their free state, are of different pitch, and those strands may be of different diameter as well.

What I claim as my invention is:

1. In combination, an upholstery spring structure having a substantially horizontally extending elongated border frame, and an insulator extending lengthwise of said border frame and comprising an elongated, substantially horizontally extending, bodily stretchable, sheet of flexible material having transversely extending undulations, and a plurality of elongated, laterally spaced, substantially parallel, stretchable, resilient, reinforcing strands threaded through said undulations and extending longitudinally of said sheet, said insulator having, in the initial free state thereof, a lengthwise dimension less than the minimum lengthwise dimension of said elongated border frame, said insulator being longitudinally stretched whereby the length of said stretched insulator approximates the length of said elongated border frame, and means securing opposite ends of said stretched insulator to opposite ends of said border frame and holding said stretched insulator under longitudinal tension.

2. The structure defined in claim 1, wherein the securing means comprise transversely extending anchorage members at opposite ends of said insulator, said strands being terminally connected to said anchorage members, and means connecting said anchorage members to opposite ends of said border frame.

3. The structure defined in claim 2, wherein the connecting means are fasteners having portions respectively embracing said anchorage members and opposite ends of said border frame.

4. The structure defined in claim 2, wherein additional means connect the front and rear longitudinally extending edges respectively of said insulator to the longitudinally extending front and rear sides of said elongated border frame.

5. The structure defined in claim 4, wherein the additional means are fasteners having portions respectively piercing the sheet of flexible material and embracing the front and rear sides of said elongated border frame.

6. The structure defined in claim 1, wherein said strands are helical in configuration.

7. The structure defined in claim 6, wherein certain of said strands are of one pitch, and other of said strands are of a different pitch.

8. The structure defined in claim 6, wherein certain of said strands are of one diameter, and other of said strands are of a different diameter.

9. The structure defined in claim 1, wherein said strands are of undulating form.

References Cited in the file of this patent

UNITED STATES PATENTS

| | | |
|---|---|---|
| 2,341,254 | Williams et al. | Feb. 8, 1944 |
| 2,906,320 | Reed | Sept. 29, 1959 |
| 2,961,759 | Weissfloch | Nov. 29, 1960 |
| 3,024,477 | Reed | Mar. 13, 1962 |
| 3,032,868 | Billner | May 8, 1962 |